T. J. BALDWIN.
AXLE LEVELING DEVICE.
APPLICATION FILED JAN. 4, 1912.
1,035,843.
Patented Aug. 20, 1912.
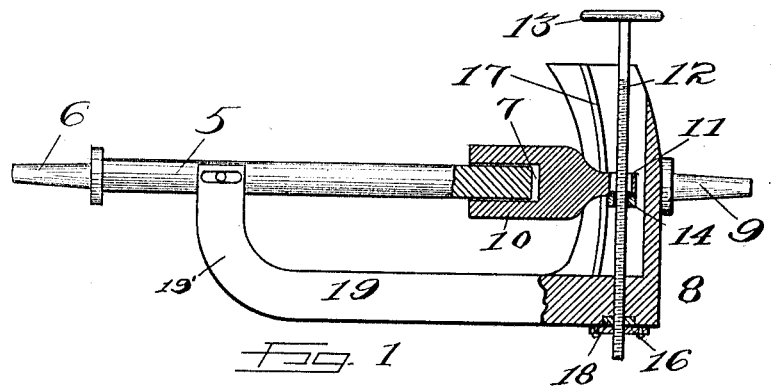
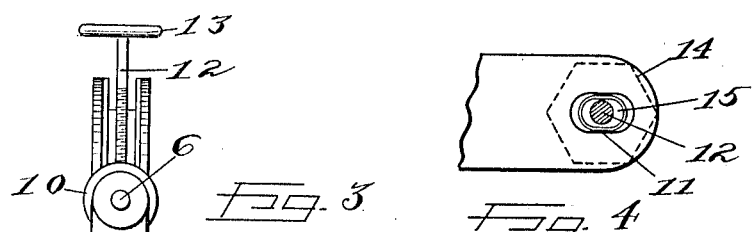
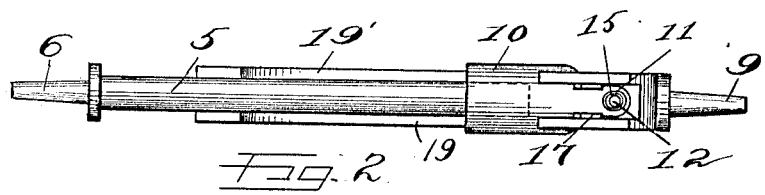
Witnesses
Nevelle Lyles
F. G. Campbell
Inventor
Thomas J. Baldwin
By Samuel H. Mick
Attorney

UNITED STATES PATENT OFFICE.

THOMAS J. BALDWIN, OF VALE, SOUTH DAKOTA.

AXLE-LEVELING DEVICE.

1,035,843.  Specification of Letters Patent.  Patented Aug. 20, 1912.

Application filed January 4, 1912. Serial No. 669,517.

*To all whom it may concern:*

Be it known that I, THOMAS J. BALDWIN, a citizen of the United States of America, residing at Vale, in the county of Butte and State of South Dakota, have invented certain new and useful Improvements in an Axle-Leveling Device, of which the following is a specification.

This invention relates to an axle leveling device and has for its object the provision of a device of this character that is simply and economically constructed and which will effectively level an axle supporting the body or bed of a machine or vehicle, thereby bringing the body or bed of the machine or vehicle to a level position, notwithstanding that the wheels supporting the axle rest on non-level ground.

This device is primarily intended for use in connection with grain threshing separators or seed hullers, which when in operation as separators or hullers, must be in an upright position or with their base or bed reposing in a level position, but the device can be attached to any other machine, engine, or the like, mounted on wheels, and which, when in operation, must be in a level position.

Further objects and advantages of the invention are set forth in the detailed description which now follows:

In the accompanying drawing, Figure 1 is a side elevation of the axle, viewed from the rear of the machine supported by the axle, with a portion of the axle leveling mechanism in section. Fig. 2 is a plan view thereof, with the hand wheel removed. Fig. 3 is an end elevation thereof looking from the right in Fig. 1, and from the right side of the machine supported by the axle, and Fig. 4 is a plan view of the cap and nut hereinafter described.

Like numerals designate corresponding parts in all the figures of the drawing.

Referring to the drawing, numeral 5 designates an axle and 6 one of the spindles or skeins thereof. The axle has been cut off at 7 for the reception of an axle end cap 10 which enters the skein head 8. A spindle or skein is carried by the skein head 8, the device constituting the invention being designed to move the skein head 8 and skein 9 vertically with relation to cap or axle end 10 and to thereby maintain axle 5 and the vehicle, by which it is carried, in a level position independently of the contour of the ground upon which the wheels rest. Axle end cap 10 has an opening 11 formed therethrough, through which a threaded rod 12 passes. The rod 12 is provided with an operating hand wheel 13, and said rod is threaded into a nut 14. The nut 14 has a reduced portion 15 (see Fig. 4) which enters the opening 11, said opening 11 being an elongated one. The reduced portion 15 of the nut has sufficient play in the opening 11 to permit the necessary movement of the end cap 10 with relation to skein head 8 without binding. A collar 16 carried by the rod 12, rests upon and is supported by the lower portion of the skein head 8, at 18, the lower end of the rod 12 passing through the lower portion of the skein head 8, the axle end cap 10 being supported by the nut 14, which is supported by the threaded rod 12, said rod carrying the collar 16, resting upon the lower portion of the skein head 8, at 18, the weight upon the axle preventing an upward endwise movement of the rod 12, and the collar 16 resting upon the lower portion of the skein head 8, preventing any endwise movement of the rod 12 downward.

The internal faces of the skein head 8 are provided with guide ribs 17, which engage in recesses formed in the sides of the axle end cap 10, preventing endwise movement of the cap 10 inside the skein head 8. An extension 19 or arm of the skein 8, extends toward the spindle or skein 6, and engages the side of the axle 5, another extension or arm 19' of the skein head 8 corresponding to 19, extends toward the spindle 6 and engages the opposite side of the axle 5. The connection of arms 19 and 19' with the axle 5 is a loose one (as by a pin or slot) to permit a lateral movement of the skein head 8 with relation to axle 5 when raising or lowering the cap 10. It will therefore be apparent that the rotation of the hand wheel 13 will cause an upward or downward movement of the cap 10, and bring the axle 5 to a level position regardless of the position of the spindle or skein 9.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention what I claim is:—

1. In an axle leveling device, the combination with an axle section carrying a spindle, of a spindle carrying head, a cap mounted upon the axle section, a vertically disposed threaded member journaled in the spindle carrying head and a nut engaged with said threaded member upon which the cap bears.

2. In a device of the character described, the combination with an axle section, having a spindle mounted upon one end thereof, of a cap engaging the opposite end of the axle section, said cap having an elongated opening formed therein, a nut upon which the cap bears, said nut having an extension which enters said elongated opening, a spindle carrying section, and a threaded rod passing through said nut and supported by said head.

3. In a device of the character described, the combination with an axle section, having a spindle mounted upon one end thereof, of a cap engaging the opposite end of the axle section, said cap having an elongated opening formed therein, a nut upon which the cap bears, said nut having an extension which enters said elongated opening, a spindle carrying section, a threaded rod passing through said nut and supported by said head and guide ribs carried by said head and engaging said cap.

In testimony whereof I affix my signature in presence of two witnesses.

THOMAS J. BALDWIN.

Witnesses:
W. E. BENEDICT,
THOMAS G. WALL.

---

Copies of this patent may be obtained for five cents each, by addressing the "Commissioner of Patents, Washington, D. C."